US012626880B2

(12) United States Patent
Allaedini

(10) Patent No.: US 12,626,880 B2
(45) Date of Patent: May 12, 2026

(54) X-RAY WINDOW WITH STACK OF LAYERS

(71) Applicant: Moxtek, Inc., Orem, UT (US)

(72) Inventor: Ghazaleh Allaedini, Pleasant Grove, UT (US)

(73) Assignee: Moxtek, Inc., Orem, UT (US)

( * ) Notice: Subject to any disclaimer, the term of this patent is extended or adjusted under 35 U.S.C. 154(b) by 152 days.

(21) Appl. No.: 18/784,417

(22) Filed: Jul. 25, 2024

(65) Prior Publication Data

US 2025/0069841 A1 Feb. 27, 2025

Related U.S. Application Data

(60) Provisional application No. 63/578,781, filed on Aug. 25, 2023.

(51) Int. Cl.
*H01J 35/18* (2006.01)

(52) U.S. Cl.
CPC ......... *H01J 35/18* (2013.01); *H01J 2235/183* (2013.01)

(58) Field of Classification Search
CPC ............................ H01J 35/18; H01J 2235/183
See application file for complete search history.

(56) References Cited

U.S. PATENT DOCUMENTS

| | | | | |
|---|---|---|---|---|
| 5,226,067 A * | 7/1993 | Allred | G21K 1/10 378/140 |
| 7,035,379 B2 * | 4/2006 | Turner | H01J 9/26 378/140 |
| 10,930,465 B2 * | 2/2021 | Sommer | H01J 35/18 |
| 2019/0214217 A1 * | 7/2019 | Sommer | H01J 5/18 |
| 2020/0013578 A1 * | 1/2020 | Sommer | C09J 167/00 |

* cited by examiner

*Primary Examiner* — Uzma Alam
*Assistant Examiner* — Fani Polyzos Boosalis
(74) *Attorney, Agent, or Firm* — Thorpe North & Western, LLP

(57) ABSTRACT

A mounted x-ray window 10 and 20 can include an x-ray window 18 mounted on the flange **11*f* of a housing 11. The x-ray window 18 can include the following layers: a top strong layer 17, a stress-relief layer 16, a bottom strong layer 15, an adhesive layer 14 then a support ring 13**. These layers can have a material composition and thickness for optimizing x-ray window low gas permeability, low outgassing, high strength, low visible and infrared light transmission, high x-ray flux, low atomic number materials, corrosion resistance, high reliability, and low-cost.

20 Claims, 3 Drawing Sheets

X-RAY WINDOW WITH STACK OF LAYERS

CLAIM OF PRIORITY

This application claims priority to US Provisional Patent Application Number U.S. 63/578,781, filed on Aug. 25, 2023, which is incorporated herein by reference.

FIELD OF THE INVENTION

The present application is related to x-ray windows.

BACKGROUND

X-ray windows are designed to transmit a high percent of x-rays, even low energy x-rays. X-ray windows are used in expensive systems requiring high reliability. High system requirements result in demanding characteristics of the x-ray window.

BRIEF DESCRIPTION OF THE DRAWINGS (DRAWINGS MIGHT NOT BE DRAWN TO SCALE)

Figure 1:
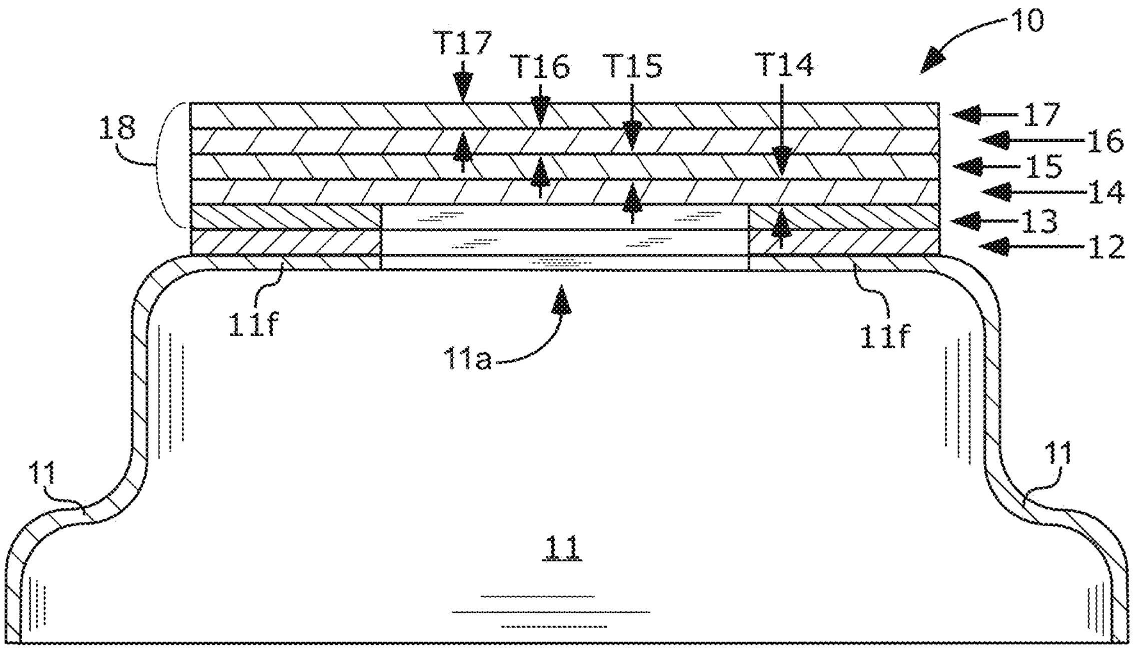

FIG. 1 is a cross-sectional side-view of a mounted x-ray window 10 including an x-ray window 18 bonded to a flange **11*f* of a housing 11 by a bonding ring 12. The x-ray window 18 can include a top strong layer 17, a stress-relief layer 16, a bottom strong layer 15, an adhesive layer 14, and a support ring 13**.

Figure 2:
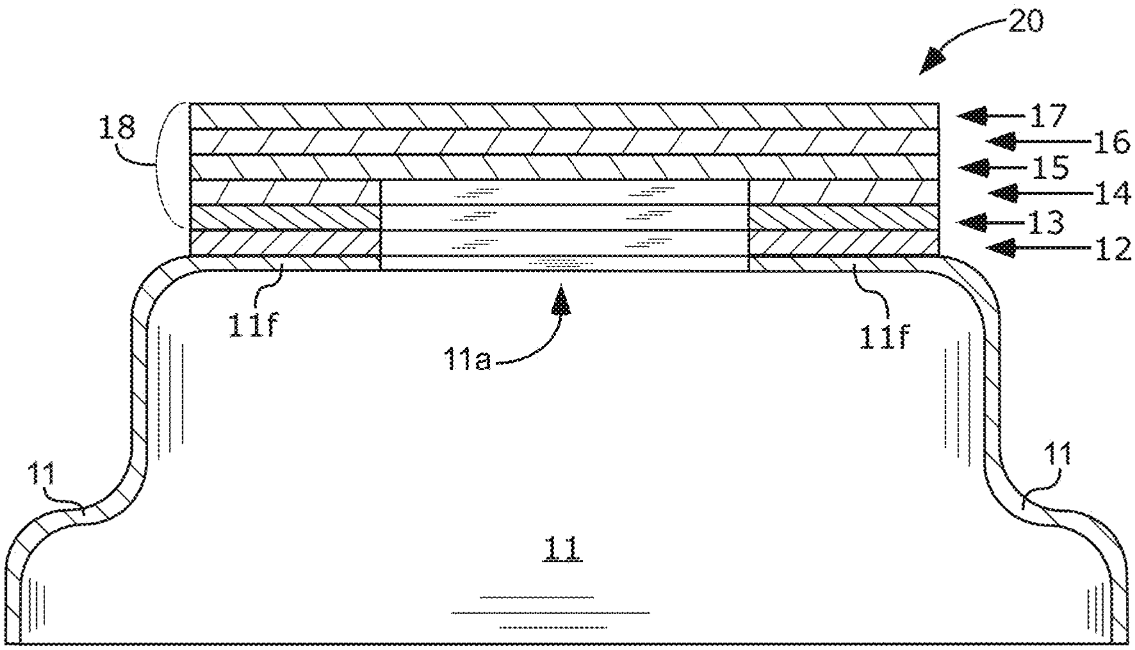

FIG. 2 is a top-view of a mounted x-ray window 20, similar to the mounted x-ray window 10, except that the adhesive layer 14 in mounted x-ray window 20 has a ring shape.

Figure 3:
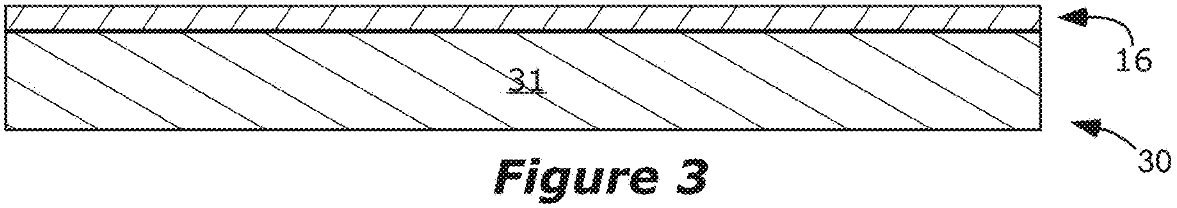

FIG. 3 is a cross-sectional side-view illustrating a step 30 in a method of making a mounted x-ray window 10 or 20, including applying a stress-relief layer 16 on a wafer 31.

Figure 4:
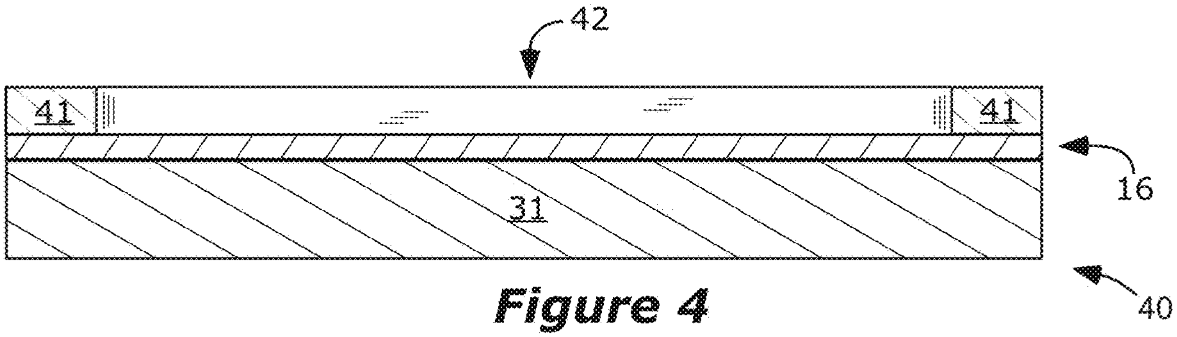

FIG. 4 is a cross-sectional side-view illustrating a step 40 in a method of making a mounted x-ray window 10 or 20, including attaching a solid ring 41 on the stress-relief layer 16. Step 40 can follow step 30.

Figure 5:
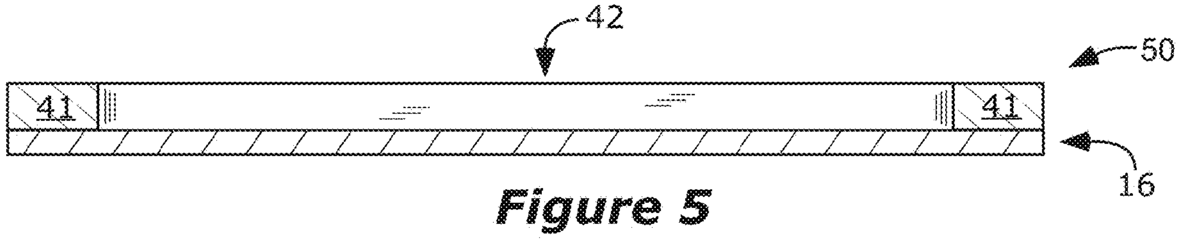

FIG. 5 is a cross-sectional side-view illustrating a step 50 in a method of making a mounted x-ray window 10 or 20, including using an acid to release the stress-relief layer 16 from the solid wafer 31 with the solid ring 41 remaining attached to the stress-relief layer 16. Step 50 can follow step 40.

Figure 6:
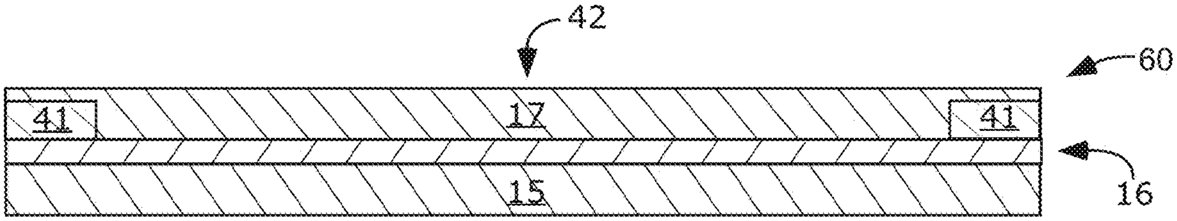

FIG. 6 is a cross-sectional side-view illustrating a step 60 in a method of making a mounted x-ray window 10 or 20, including depositing a top strong layer 17 across one side of the stress-relief layer 16 and a bottom strong layer 15 across an opposite side of the stress-relief layer 16. Step 60 can follow step 50.

Figure 7:
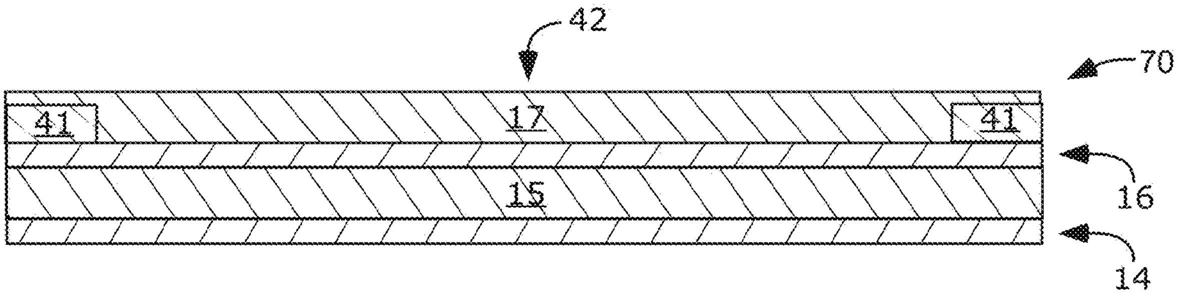

FIG. 7 is a cross-sectional side-view illustrating a step 70 in a method of making a mounted x-ray window 10, including applying an adhesive layer 14 on the bottom strong layer 15. Step 70 can follow step 60.

Figure 8:
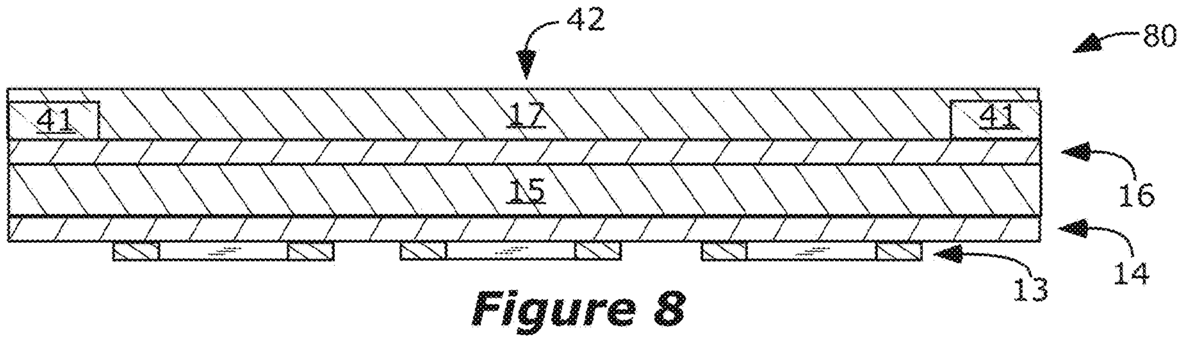

FIG. 8 is a cross-sectional side-view illustrating a step in a method of making a mounted x-ray window 10, including placing a support ring 13 on the adhesive layer 14. The support ring 13 can be aligned with a central opening 42 of the solid ring 41. The support ring 13 can include a hole. Step 80 can follow step 70.

Figure 9:
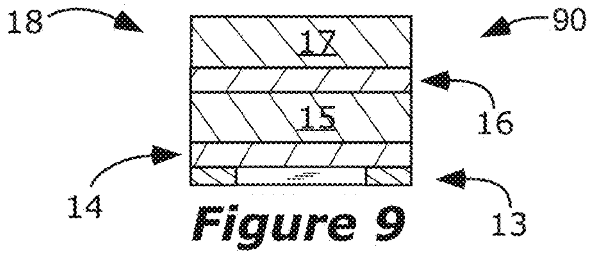

FIG. 9 is a cross-sectional side-view illustrating a step 90 in a method of making a mounted x-ray window 10, including cutting around the support ring 13 to form an x-ray window 18. Step 90 can follow step 80.

Figure 10:
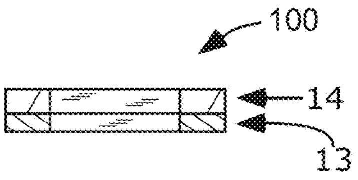

FIG. 10 is a cross-sectional side-view illustrating a step 100 in a method of making a mounted x-ray window 20, including applying an adhesive layer 14 on a support ring 13. Step 100 can follow step 60.

Figure 11:
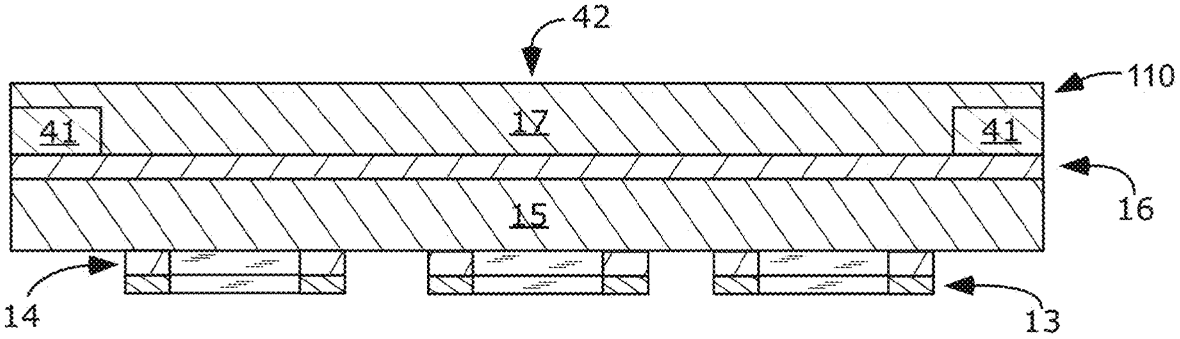

FIG. 11 is a cross-sectional side-view illustrating a step 110 in a method of making a mounted x-ray window 20, including placing the support ring 13 and the adhesive layer 14 on the bottom strong layer 15, with the adhesive layer 14 sandwiched between the support ring 13 and the bottom strong layer 15. The support ring 13 and the adhesive layer 14 can be aligned with a central opening 42 of the solid ring 41. Step 110 can follow step 100.

Figure 12:
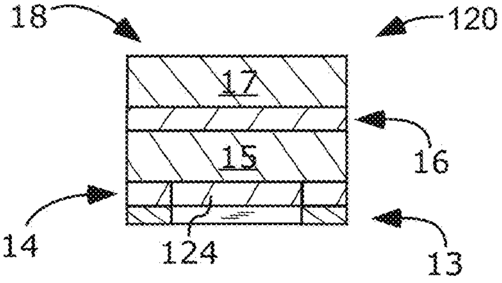

FIG. 12 is a cross-sectional side-view illustrating a step 120 in a method of making a mounted x-ray window 20, including placing a drop of polymer 124 on the bottom strong layer 15 within an opening of the adhesive layer 14. Step 120 can follow step 110.

Figure 13:
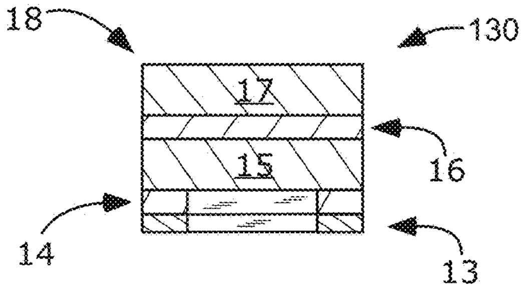

FIG. 13 is a cross-sectional side-view illustrating a step 130 in a method of making a mounted x-ray window 20, including cutting around the support ring 13 to form an x-ray window 18. Step 130 can follow step 120.

Definitions. The following definitions, including plurals of the same, apply throughout this patent application.

As used herein, the terms “on”, “located on”, “located at”, and “located over” mean located directly on or located over with some other solid material between. The terms “located directly on”, “adjoin”, “adjoins”, and “adjoining” mean direct and immediate contact.

As used herein, the terms “same as” or “equals” mean exactly the same; the same within normal manufacturing tolerances; or almost exactly the same, such that any deviation from exactly the same would have negligible effect for ordinary use of the device.

As used herein, the term “nm” means nanometer(s).

As used herein, the term “x-ray tube” is not limited to tubular/cylindrical shaped devices. The term “tube” is used because this is the standard term used for x-ray emitting devices.

DETAILED DESCRIPTION

Useful characteristics of x-ray windows include low gas permeability, low outgassing, high strength, low visible and infrared light transmission, high x-ray flux, made of low atomic number materials, corrosion resistance, high reliability, and low-cost. Each x-ray window design is a balance between these characteristics.

An x-ray window can combine with a housing to enclose an internal vacuum. The internal vacuum can aid device performance. For example, an internal vacuum for an x-ray detector (a) minimizes gas attenuation of incoming x-rays and (b) allows easier cooling of the x-ray detector.

Permeation of a gas through the x-ray window can degrade the internal vacuum. Thus, low gas permeability is a desirable x-ray window characteristic.

Outgassing from x-ray window materials can degrade the internal vacuum of the device. Thus, selection of materials with low outgassing is useful.

The x-ray window can face vacuum on one side and atmospheric pressure on an opposite side. Therefore, the x-ray window may need strength to withstand this differential pressure. Visible and infrared light can cause undesirable noise in the x-ray detector. The ability to block transmission of visible and infrared light is another useful characteristic of x-ray windows.

A high x-ray flux through the x-ray window allows rapid functioning of the x-ray detector. Therefore, high x-ray transmissivity through the x-ray window is useful.

Detection and analysis of low-energy x-rays is needed in some applications. High transmission of low-energy x-rays is thus another useful characteristic of x-ray windows.

X-rays can be used to analyze a sample. X-ray noise from surrounding devices, including from the x-ray window, can interfere with a signal from the sample. X-ray noise from high atomic number materials are more problematic. It is helpful, therefore, for the x-ray window to be made of low atomic number materials.

X-ray windows are used in corrosive environments, and may be exposed to corrosive chemicals during manufacturing. Thus, corrosion resistance is another useful characteristic of an x-ray window.

X-ray window failure is intolerable in many applications. For example, x-ray windows are used in analysis equipment on Mars. High reliability is a useful x-ray window characteristic.

X-ray window customers demand low-cost x-ray windows with the above characteristics. Reducing x-ray window cost is another consideration.

The x-ray windows described herein, and x-ray windows manufactured by the methods described herein, can have these useful characteristics (low gas permeability, low outgassing, high strength, low visible and infrared light transmission, high x-ray flux, low atomic number materials, corrosion resistance, high reliability, and low-cost). Each example may satisfy one, some, or all of these useful characteristics.

As illustrated in FIGS. 1 and 2, mounted x-ray windows 10 and 20 can include an x-ray window 18 mounted on the flange 11*f* of a housing 11. The flange 11*f* can encircle an aperture 11*a*. The x-ray window 18 can span and cover the aperture 11*a* (meaning that at least some layers of the x-ray window 18 span and cover the aperture 11*a*).

The x-ray window 18 can include the following layers in the following order: a top strong layer 17, a stress-relief layer 16, a bottom strong layer 15, an adhesive layer 14 then a support ring 13. The support ring 13 can include a hole that is aligned with the aperture 11*a*. The support ring 13 can be located closer to the flange 11*f* than any of the other layers. The top strong layer 17 can be located farthest from the flange 11*f* than any of the other layers.

The top strong layer 17 and the bottom strong layer 15 can have a material composition and thickness for optimizing x-ray window strength and ability to block visible light. The top strong layer 17 and the bottom strong layer 15 are strong relative to other layers, such as the stress-relief layer 16. Although the top strong layer 17 and the bottom strong layer 15 can have the same material composition, their strength can be improved by use of these two layers instead of as a single, thicker layer with this material composition.

The top strong layer 17 and the bottom strong layer 15 can each include boron. The top strong layer 17 and/or the bottom strong layer 15 can include ≥80 mass percent boron, ≥90 mass percent boron, or ≥95 mass percent boron. The top strong layer 17 and/or the bottom strong layer 15 can include≤99.5 mass percent boron, ≤98 mass percent boron, or ≤95 mass percent boron.

The top strong layer 17 and the bottom strong layer 15 can also include hydrogen, carbon, aluminum, nitrogen, or combinations thereof.

For example, the top strong layer 17 and/or the bottom strong layer 15 can include boron and hydrogen. The top strong layer 17 and the bottom strong layer 15 can each include ≥80, ≥90, ≥95, ≥97, ≥98, or ≥99 mass percent boron. The top strong layer 17 and the bottom strong layer 15 can each include ≥0.01, ≥0.05, ≥0.1, ≥0.5, ≥0.9, ≥2, or ≥4 mass percent hydrogen.

As another example, the top strong layer 17 and/or the bottom strong layer 15 can include boron and carbon. The top strong layer 17 and the bottom strong layer 15 can each include ≥60, ≥70, or ≥76; and ≤80, ≤85, or ≤90 mass percent boron. The top strong layer 17 and the bottom strong layer 15 can each include ≥15 or ≥20; and ≤24 or ≤30 mass percent carbon.

As another example, the top strong layer 17 and/or the bottom strong layer 15 can include boron and aluminum. The top strong layer 17 and the bottom strong layer 15 can each include ≥70, ≥75, or ≥81; and ≤85, ≤90, or ≤95 mass percent boron. The top strong layer 17 and the bottom strong layer 15 can each include ≥10 or ≥15; and ≤19 or ≤25 mass percent aluminum.

As another example, the top strong layer 17 and/or the bottom strong layer 15 can include boron and nitrogen. The top strong layer 17 and the bottom strong layer 15 can each include ≥35, ≥40, or ≥42; and ≤46, ≤50, or ≤55 mass percent boron. The top strong layer 17 and the bottom strong layer 15 can each include ≥45, ≥50, or ≥54; and ≤58, ≤60, or ≤65 mass percent nitrogen.

In the above examples of different material combinations for the top strong layer 17 and the bottom strong layer 15, the total mass percent is of course 100%, and includes the elements in the mass percent ranges noted, plus other chemical elements, if any.

Example thicknesses T17 of the top strong layer 17 at the aperture 11*a* include ≥400 nm, ≥800 nm, or ≥1200 nm; and ≤2400 nm, ≤4000 nm, or ≤8000 nm. Example thicknesses T15 of the bottom strong layer 15 at the aperture 11*a* can be ≥400 nm, ≥800 nm, or ≥1200 nm; and ≤2400 nm, ≤4000 nm, or ≤8000 nm. The thickness T17 of the top strong layer 17 at the aperture 11*a* can equal the thickness T15 of the bottom strong layer 15 in the aperture 11*a*.

Placing the stress-relief layer 16 between the top strong layer 17 and the bottom strong layer 15 can reduce stress and brittleness in the top strong layer 17 and in the bottom strong layer 15. This can increase the life of, and avoid early failure of, the x-ray window 18. The material composition and thickness of the stress-relief layer 16 are selected to improve its ability to thus reduces stress and brittleness in the top strong layer 17 and in the bottom strong layer 15.

The stress-relief layer 16 can have the same or similar material composition as the adhesive layer 14. The stress-relief layer 16, the adhesive layer 14, or both can include a polymer, such as polyimide. The stress-relief layer 16 and the adhesive layer 14 can include at least 95 mass percent of the same polymer. The stress-relief layer 16, the adhesive layer 14, or both can include ≥80 mass percent, ≥90 mass percent, or ≥95 mass percent polyimide.

The stress-relief layer 16 can have a relatively larger thickness for stress relief of the top strong layer 17 and the bottom strong layer 15. The adhesive layer 14 can have a relatively smaller thickness to improve the bond between the bottom strong layer 15 and the support ring 13. For example, a thickness T16 of the stress-relief layer 16 at the aperture 11*a* can be ≥1.5, ≥2, or ≥2.5 times a thickness T14 of the adhesive layer 14. As another example, the thickness T16 of the stress-relief layer 16 at the aperture 11*a* can be ≤4, ≤6, or ≤10 times a thickness T14 of the adhesive layer 14.

Example thicknesses T16 of the stress-relief layer 16 in the aperture 11*a* include ≥25 nm, ≥50 nm, or ≥100 nm; and ≤400 nm, ≤800 nm, or ≤1200 nm. Example thicknesses T14 of the adhesive layer 14 include ≥10 nm, ≥20 nm, or ≥40 nm; and ≤200 nm, ≤300 nm, or ≤600 nm.

The stress-relief layer 16 does not need to be as thick as the top strong layer 17 or the bottom strong layer 15. It is useful to keep the stress-relief layer 16 no thicker than required in order to minimize x-ray attenuation. Also, the stress-relief layer 16 usually includes higher atomic number elements than the strong layers 15 and 17. Higher atomic number elements can contaminate the x-ray spectrum, so it is particularly helpful to reduce thickness of any layer with higher atomic number elements.

For example, a thickness T17 of the top strong layer 17 in the aperture 11*a* can be ≥2, ≥4, or ≥5; and ≤6, ≤10, or ≤15 times larger than a thickness T16 of the stress-relief layer 16. As another example, a thickness T15 of the bottom strong layer 15 in the aperture 11*a* can be ≥2, ≥4, or ≥5; and ≤6, ≤10, or ≤15 times larger than a thickness T16 of the stress-relief layer 16.

As illustrated in FIGS. 1-2, the top strong layer 17, the stress-relief layer 16, and the bottom strong layer 15 can span the aperture 11*a*.

The adhesive layer 14 also spans the aperture 11*a* in mounted x-ray window 10. This may be preferred for increased stress reduction of the bottom strong layer 15. Mounted x-ray window 10 can be made by the first method below.

The adhesive layer 14 does not span the aperture 11*a* in mounted x-ray window 20. This may be preferred for reduced x-ray attenuation. Mounted x-ray window 20 can be made by the second method below.

The support ring 13 can reduce stress in the x-ray window 18 by including a material with an intermediate coefficient of thermal expansion between the coefficient of thermal expansion of the housing 11 and coefficients of thermal expansion of layers in the x-ray window 18. The support ring 13 can include nickel, cobalt, iron, carbon, manganese, silicon, or combinations thereof. For example, the support ring 13 can include ≥24 mass percent and ≤34 mass percent nickel; ≥7 mass percent and ≤27 mass percent cobalt; and ≥43 mass percent and ≤64 mass percent iron. A sum of the above mass percentages plus mass percentages of trace elements in the support ring 13 can equal 100 mass percent. Example trace elements include carbon, manganese, and silicon.

A bonding ring 12 can be sandwiched between the support ring 13 and the flange 11*f*. The bonding ring 12 can seal the support ring 13 to the flange 11*f*. The bonding ring 12 can be a brazed metal, liquid crystal polymer, or other adhesive.

Method

A first method of making a mounted x-ray window can include some or all of the following steps:

Step 30 (FIG. 3) can include applying a stress-relief layer 16 on a solid wafer 31. The stress-relief layer 16 can be applied by spin coating. A silicon wafer is preferred. For example, the wafer 31 can includes ≥80 mass percent, ≥95 mass percent, or ≥99 mass percent silicon.

Step 40 (FIG. 4) can include attaching a solid ring 41 on the stress-relief layer 16 before releasing the stress-relief layer 16 from the solid wafer 31. The solid ring 41 can be placed on the stress-relief layer 16 while the stress-relief layer 16 is still wet, forming a bond as the stress-relief layer 16 cures.

The stress-relief layer 16 can be cured at 400° C. at this stage of the method.

Step 50 (FIG. 5) can include releasing the stress-relief layer 16 from the solid wafer 31. The solid ring 41 (if used) can remain attached to the stress-relief layer 16 as the stress-relief layer 16 is released from the solid wafer 31. An acid (e.g. hydrofluoric acid) can be used to release the stress-relief layer 16 from the solid wafer 31. After exposing the stress-relief layer 16 and the solid wafer 31 to acid, they can be rinsed with water. The water can have a neutral PH (~7).

Step 60 (FIG. 6) can include depositing a top strong layer 17 across one side of the stress-relief layer 16 and a bottom strong layer 15 across an opposite side of the stress-relief layer 16. A chemical vapor deposition process with diborane may be used to deposit boron for the top strong layer 17 and the bottom strong layer 15. The solid ring 41 can support the stress-relief layer 16 during this chemical vapor deposition process Step 70 (FIG. 7) can include applying an adhesive layer 14 on the bottom strong layer 15. The adhesive layer 14 can be applied by spin coating.

Step 80 (FIG. 8) can include placing a support ring 13 on the adhesive layer 14. The support ring 13 can be aligned with a central opening 42 of the solid ring 41. Step 80 can include placing multiple support rings 13 on the adhesive layer 14, all of which can be aligned with a central opening 42 of the solid ring 41.

The adhesive layer 14 can be cured at room temperature for 24 hours at this stage of the method.

Step 90 (FIG. 9) can include cutting around the support ring 13 to form an x-ray window 18. The x-ray window 18 can include the following layers in the following order: the top strong layer 17, the stress-relief layer 16, the bottom strong layer 15, the adhesive layer 14, and then the support ring 13. This cut can be done manually with a razor. This cut can be repeated multiple times to form multiple x-ray windows 18.

A final step (FIG. 1) can include bonding the x-ray window 18 to a flange 11*f* of a housing 11. This step can include placing a bonding ring 12 (e.g. LCP, adhesive, or braze material) on the support ring 13, on the flange 11*f*, or on both. The bonding ring 12 can be sandwiched between the x-ray window 18 and the flange 11*f*. The hole of the support ring 13 can be aligned with a hole of the bonding ring 12 and with the aperture 11*a* of the flange 11*f*. The bonding ring 12 can be cured (typically by heat) to form a hermetic seal between the x-ray window 18 and the flange 11*f*. This final step can be repeated multiple times to form multiple x-ray windows 18 if multiple support rings 13 are used.

A second method of making a mounted x-ray window can include some or all of the following steps:

Step 30 (FIG. 3) can include applying a stress-relief layer 16 on a solid wafer 31. The stress-relief layer 16 can be applied by spin coating. A silicon wafer is preferred. For example, the wafer 31 can includes ≥80 mass percent, ≥95 mass percent, or ≥99 mass percent silicon.

Step 40 (FIG. 4) can include attaching a solid ring 41 on the stress-relief layer 16 before releasing the stress-relief layer 16 from the solid wafer 31. The solid ring 41 can be placed on the stress-relief layer 16 while the stress-relief layer 16 is still wet, forming a bond as the stress-relief layer 16 cures.

The stress-relief layer 16 can be cured at 400° C. at this stage of the method.

Step 50 (FIG. 5) can include releasing the stress-relief layer 16 from the solid wafer 31. The solid ring 41 can remain attached to the stress-relief layer 16 as the stress-relief layer 16 is released from the solid wafer 31. An acid (e.g. hydrofluoric acid) can be used to release the stress-relief layer 16 from the solid wafer 31. After exposing the stress-relief layer 16 and the solid wafer 31 to acid, they can be rinsed with water. The water can have a neutral pH (~7).

Step 60 (FIG. 6) can include depositing a top strong layer 17 across one side of the stress-relief layer 16 and a bottom strong layer 15 across an opposite side of the stress-relief layer 16. A chemical vapor deposition process with diborane may be used to deposit boron for the top strong layer 17 and the bottom strong layer 15.

Step 100 (FIG. 10) can include applying an adhesive layer 14 on a support ring 13. Step 100 can include applying multiple adhesive layers 14 on multiple support rings 13 with each of the multiple adhesive layers 14 located on one of the multiple support rings 13. Subsequent steps in the second method can be repeated multiple times to form multiple x-ray windows 18.

Step 110 (FIG. 11) can include placing the support ring 13 and the adhesive layer 14 on the bottom strong layer 15 with the adhesive layer 14 sandwiched between the support ring 13 and the bottom strong layer 15. The support ring 13 and the adhesive layer 14 can be aligned with a central opening 42 of the solid ring 41. This step 110 can be repeated multiple times if multiple adhesive layers 14 and support rings 13 were prepared in the prior step 100.

Step 120 (FIG. 12) can include placing a drop of polymer 124 (e.g. polyimide) on the bottom strong layer 15 within an opening of the adhesive layer 14. The adhesive layer 14 can form a circle around the drop of polymer 124. A material composition of the drop of polymer 124 can be the same as a material composition of the adhesive layer 14. This step 110 can be repeated multiple times if multiple adhesive layers 14, each with a support ring 13, were placed on the bottom strong layer 15 in the prior step 110.

The adhesive layer 14 can be cured at room temperature for 24 hours at this stage of the method.

Step 130 (FIG. 13) can include cutting around the support ring 13 to form an x-ray window 18. The x-ray window 18 can include the following layers in the following order: the top strong layer 17, the stress-relief layer 16, the bottom strong layer 15, the adhesive layer 14, and then the support ring 13. This cut can be done manually with a razor. This cut can be repeated multiple times to form multiple x-ray windows 18.

A final step (FIG. 2) can include bonding the x-ray window 18 to a flange 11*f* of a housing 11. This step can include placing a bonding ring 12 (e.g. LCP, adhesive, or braze material) on the support ring 13, on the flange 11*f*, or on both. The bonding ring 12 can be sandwiched between the x-ray window 18 and the flange 11*f*. The hole of the support ring 13 can be aligned with a hole of the bonding ring 12 and with the aperture 11*a* of the flange 11*f*. The bonding ring 12 can be cured (typically by heat) to form a hermetic seal between the x-ray window 18 and the flange 11*f*. Note that the x-ray window 18 in FIG. 2 doesn't show the drop of polymer 124, but the drop of polymer 124 can be applied as described in step 120. This final step can be repeated multiple times to form multiple x-ray windows 18 if multiple support rings 13 are used.

What is claimed is:

1. A mounted x-ray window comprising:

a housing including a flange encircling an aperture;

an x-ray window mounted on the flange and spanning and covering the aperture;

the x-ray window including the following layers in the following order: a top strong layer, a stress-relief layer, a bottom strong layer, an adhesive layer, then a support ring, the support ring located closest to the flange than any other layer of the x-ray window;

the support ring includes a hole that is aligned with the aperture;

the top strong layer includes boron, the stress-relief layer includes polyimide, the bottom strong layer includes boron, and the adhesive layer includes polyimide;

a bonding ring is sandwiched between the support ring and the flange, the bonding ring sealing the support ring to the flange; and wherein the support ring includes: ≥24 mass percent and ≤34 mass percent nickel; ≥7 mass percent and ≤27 mass percent cobalt; ≥43 mass percent and ≤64 mass percent iron; and a sum of the above mass percentages plus mass percentages of trace elements equal 100 mass percent.

2. The mounted x-ray window of claim 1, wherein the trace elements include carbon, manganese, and silicon.

3. A mounted x-ray window comprising:

a housing including a flange encircling an aperture;

an x-ray window mounted on the flange and spanning and covering the aperture;

the x-ray window including the following layers in the following order: a top strong layer, a stress-relief layer, a bottom strong layer, an adhesive layer, then a support ring;

the top strong layer located farther from the flange than any other layer of the x-ray window;

the top strong layer and the bottom strong layer each include boron;

the top strong layer and the bottom strong layer each include hydrogen, carbon, aluminum, nitrogen, or combinations thereof;

the stress-relief layer and the adhesive layer each include a polymer;

the support ring includes a hole that is aligned with the aperture;

a bonding ring between the support ring and the flange, the bonding ring sealing the support ring to the flange; and wherein the support ring includes: ≥24 mass percent and ≤34 mass percent nickel; ≥7 mass percent and ≤27 mass percent cobalt; ≥43 mass percent and ≤64 mass percent iron; and a sum of the above mass percentages plus mass percentages of trace elements in the support ring equal 100 mass percent.

4. The mounted x-ray window of claim 3, wherein the trace elements include carbon, manganese, and silicon.

5. The mounted x-ray window of claim 3, wherein the stress-relief layer and the adhesive layer include at least 95 mass percent of the same polymer.

6. The mounted x-ray window of claim 3, wherein the stress-relief layer and the adhesive layer each include ≥95 mass percent polyimide.

7. The mounted x-ray window of claim 3, wherein the top strong layer and the bottom strong layer each include ≥95 mass percent boron.

8. The mounted x-ray window of claim 3, wherein the top strong layer, the stress-relief layer, the bottom strong layer, and the adhesive layer span the aperture.

9. A mounted x-ray window comprising:

a housing including a flange encircling an aperture;

an x-ray window mounted on the flange and spanning and covering the aperture;

the x-ray window including the following layers in the following order: a top strong layer, a stress-relief layer, a bottom strong layer, an adhesive layer, then a support ring;

the top strong layer located farther from the flange than any other layer of the x-ray window;

the top strong layer and the bottom strong layer each include boron;

the top strong layer and the bottom strong layer each include hydrogen, carbon, aluminum, nitrogen, or combinations thereof;

the stress-relief layer and the adhesive layer each include a polymer;

the support ring includes a hole that is aligned with the aperture;

a bonding ring between the support ring and the flange, the bonding ring sealing the support ring to the flange;

a thickness of the top strong layer at the aperture is ≥2 and ≤10 times thicker than the stress-relief layer;

a thickness of the bottom strong layer at the aperture is ≥2 and ≤10 times thicker than the stress-relief layer; and a thickness of the stress-relief layer at the aperture is ≥1.5 and ≤6 times thicker than the adhesive layer.

10. The mounted x-ray window of claim 9, wherein:

the top strong layer and the bottom strong layer each include ≥75 mass percent boron; and the top strong layer and the bottom strong layer each include ≥10 mass percent aluminum.

11. The mounted x-ray window of claim 9, wherein the stress-relief layer and the adhesive layer include at least 95 mass percent of the same polymer.

12. The mounted x-ray window of claim 9, wherein the stress-relief layer and the adhesive layer each include ≥95 mass percent polyimide.

13. A mounted x-ray window comprising:

a housing including a flange encircling an aperture;

an x-ray window mounted on the flange and spanning and covering the aperture;

the x-ray window including the following layers in the following order: a top strong layer, a stress-relief layer, a bottom strong layer, an adhesive layer, then a support ring;

the top strong layer located farther from the flange than any other layer of the x-ray window;

the top strong layer and the bottom strong layer each include boron;

the top strong layer and the bottom strong layer each include hydrogen, carbon, aluminum, nitrogen, or combinations thereof;

the stress-relief layer and the adhesive layer each include a polymer;

the support ring includes a hole that is aligned with the aperture;

a bonding ring between the support ring and the flange, the bonding ring sealing the support ring to the flange;

a thickness of the top strong layer at the aperture is ≥800 nm and ≤4000 nm;

a thickness of the bottom strong layer at the aperture is ≥800 nm and ≤4000 nm;

a thickness of the stress-relief layer at the aperture is ≥50 nm and ≤800 nm; and a thickness of the adhesive layer is ≥20 nm and ≤300 nm.

14. The mounted x-ray window of claim 13, wherein a thickness of the top strong layer in the aperture equals a thickness of the bottom strong layer in the aperture.

15. The mounted x-ray window of claim 13, wherein:

the top strong layer and the bottom strong layer each include ≥90 mass percent boron; and the top strong layer and the bottom strong layer each include ≥0.05 mass percent hydrogen.

16. The mounted x-ray window of claim 13, wherein:

the top strong layer and the bottom strong layer each include ≥70 mass percent boron; and the top strong layer and the bottom strong layer each include ≥15 mass percent carbon.

17. The mounted x-ray window of claim 13, wherein:

the top strong layer and the bottom strong layer each include ≥75 mass percent boron; and the top strong layer and the bottom strong layer each include ≥10 mass percent aluminum.

18. The mounted x-ray window of claim 13, wherein:

the top strong layer and the bottom strong layer each include ≥35 mass percent boron; and the top strong layer and the bottom strong layer each include ≥45 mass percent nitrogen.

19. The mounted x-ray window of claim 13, wherein the stress-relief layer and the adhesive layer include at least 95 mass percent of the same polymer.

20. The mounted x-ray window of claim 13, wherein the stress-relief layer and the adhesive layer each include ≥95 mass percent polyimide.

* * * * *